US011362593B2

(12) United States Patent
Ouyang

(10) Patent No.: US 11,362,593 B2
(45) Date of Patent: Jun. 14, 2022

(54) DUAL MODE RESONANT CONVERTER, AND ASSOCIATED CONTROL CIRCUIT AND CONTROL METHOD THEREOF

(71) Applicant: Chengdu Monolithic Power Systems Co., Ltd., Chengdu (CN)

(72) Inventor: Qian Ouyang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 17/236,900

(22) Filed: Apr. 21, 2021

(65) Prior Publication Data

US 2021/0359612 A1 Nov. 18, 2021

(30) Foreign Application Priority Data

May 14, 2020 (CN) .......................... 202010407520.X

(51) Int. Cl.
*H02M 3/335* (2006.01)
*H02M 3/00* (2006.01)

(52) U.S. Cl.
CPC ......... *H02M 3/33576* (2013.01); *H02M 3/01* (2021.05); *H02M 3/33571* (2021.05); *H02M 3/33592* (2013.01)

(58) Field of Classification Search
CPC .... H02M 3/01; H02M 3/335; H02M 3/33571; H02M 3/33576; H02M 3/33592
USPC .......................................... 363/21.01, 21.02
See application file for complete search history.

(56) References Cited

U.S. PATENT DOCUMENTS

| | | | |
|---|---|---|---|
| 9,379,630 B2 | 6/2016 | Lei | |
| 9,685,876 B2 | 6/2017 | Bairen | |
| 9,812,975 B2 | 11/2017 | Yuedong | |
| 10,079,537 B2 | 9/2018 | Naixing | |
| 10,186,975 B2 | 1/2019 | Qian | |
| 10,224,823 B2 | 3/2019 | Yuedong | |
| 10,263,528 B2 | 4/2019 | Qian | |
| 10,425,013 B2 | 9/2019 | Qian | |
| 10,468,973 B2 | 11/2019 | Xiaokang | |
| 10,673,331 B2 | 6/2020 | Wenbin | |
| 10,715,048 B2 | 7/2020 | Miao | |
| 10,862,399 B1* | 12/2020 | Rai | H02M 3/33507 |
| 2020/0028441 A1 | 1/2020 | Miao | |
| 2020/0044570 A1* | 2/2020 | Kurokawa | H02M 3/33569 |
| 2021/0336557 A1* | 10/2021 | Cook | H02M 7/5395 |

OTHER PUBLICATIONS

U.S. Appl. No. 17/029,533, filed Sep. 23, 2020, Yiqing.

* cited by examiner

*Primary Examiner* — Gary L Laxton
(74) *Attorney, Agent, or Firm* — Perkins Coie LLP

(57) ABSTRACT

A control circuit for a resonant converter has a communication interface, a memory, and a primary switching control circuit. The memory provides a frequency setting signal capable of being programmed through a communication interface, the primary switching control circuit provides a first control signal to control a high-side switch and a second control signal to control a low-side switch. When the resonant converter works in an open loop mode, a frequency of the first control signal and the second control signal is determined by the frequency setting signal, an on-time period of the high-side switch equals an on-time period of the low-side switch, less than half of a resonant period.

20 Claims, 9 Drawing Sheets

DUAL MODE RESONANT CONVERTER, AND ASSOCIATED CONTROL CIRCUIT AND CONTROL METHOD THEREOF

CROSS-REFERENCE TO RELATED APPLICATIONS

This application claims the benefit of CN application 202010407520.X, filed on May 14, 2020, and incorporated herein by reference.

TECHNICAL FIELD

The present invention generally relates to electronic circuits, and more particularly but not exclusively, to resonant converter.

BACKGROUND

In a resonant converter, a switching circuit converts a DC voltage into a square wave voltage and provides it to a resonant circuit. The resonant circuit comprises a resonant inductor and a resonant capacitor, and the resonant circuit has a resonant frequency determined by the inductance of the resonant inductor and the capacitance of the resonant capacitor. The switching circuit typically works at a switching frequency equaling the resonant frequency to achieve zero current off, thus achieving an optimal efficiency performance. However, the inductance of the resonant inductor and the capacitance of the resonant capacitor in real applications may deviate far from their preset values, causing the resonant converter to deviate from its best efficiency point.

SUMMARY

Embodiments of the present invention are directed to a control circuit for a resonant converter, the resonant converter having a switching circuit, a resonant circuit, a transformer and a rectifier circuit, wherein the switching circuit comprises a high-side switch and a low-side switch, the transformer comprises a primary winding coupled to the resonant circuit, and a secondary winding coupled to the rectifier circuit to provide an output voltage, the control circuit comprising: a communication interface; a memory, coupled to the communication interface, the memory is configured to provide a frequency setting signal, the frequency setting signal is capable of being programmed through the communication interface; and a primary switching control circuit, coupled to the memory to receive the frequency setting signal, and configured to provide a first control signal and a second control signal to control the high-side switch and the low-side switch respectively, when the resonant converter is set to operate in an open loop mode, a frequency of the first control signal and the second control signal is determined by the frequency setting signal, an on-time period of the high-side switch is equal to an on-time period of the low-side switch, and the on-time period of the high-side switch is less than half of a resonant period of the resonant circuit.

Embodiments of the present invention are also directed to a control method for controlling a resonant converter, the resonant converter having a switching circuit, a resonant circuit, a transformer and a rectifier circuit, wherein the switching circuit comprises a high-side switch and a low-side switch, the transformer comprises a primary winding coupled to the resonant circuit, and a secondary winding coupled to the rectifier circuit to provide an output voltage, the control method comprising: providing a frequency setting signal, the frequency setting signal is capable of being programmed through a communication interface; providing a first control signal to control the high-side switch and a second control signal to control the low-side switch; and operating the resonant converter in an open loop mode, wherein a frequency of the high-side switch and the low-side switch is determined by the frequency setting signal, an on-time period of the high-side switch is equal to an on-time period of the low-side switch, and the on-time period of the high-side switch is less than half of a resonant period of the resonant circuit.

Embodiments of the present invention are further directed to a resonant converter, comprising: a switching circuit, comprising a high-side switch and a low-side switch; a resonant circuit, coupled to the switching circuit, the resonant circuit comprises a resonant inductor and a resonant capacitor; a transformer, comprising a primary winding and a secondary winding, wherein the primary winding is coupled to the resonant circuit; a rectifier circuit, coupled to the secondary winding, and configured to provide an output voltage; and a control circuit, configured to provide a first control signal to control the high-side switch and a second control signal to control the low-side switch, the control circuit is configured to set the resonant converter to operate in either an open loop mode or a voltage close loop mode; wherein when the resonant converter is set to operate in the open loop mode, a frequency of the high-side switch and the low side switch is determined by a frequency setting signal, an on-time period of the high-side switch is equal to an on-time period of the low-side switch, and the on-time period of the high-side switch is less than half of a resonant period of the resonant circuit.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Figure 1:
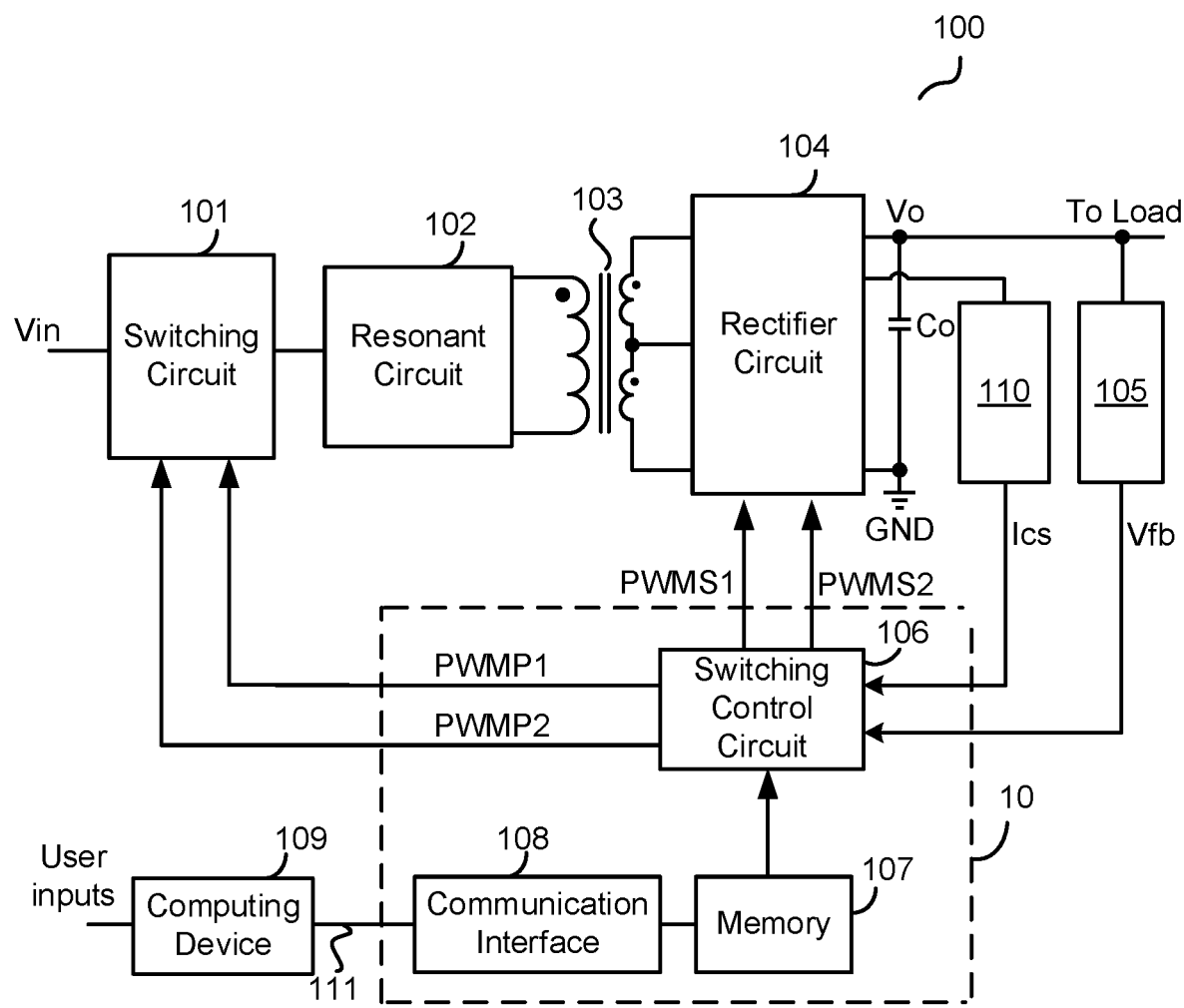
FIG. 1 is a schematic block diagram of a resonant converter 100 in accordance with an embodiment of the present invention.

FIG. 1 is a schematic block diagram of a resonant converter 100 in accordance with an embodiment of the present invention. The resonant converter 100 comprises a switching circuit 101, a resonant circuit 102, a transformer 103, a rectifier circuit 104, a switching control circuit 106, a memory 107, and a communication interface 108. In one example, the switching control circuit 106, the memory 107, and the communication interface 108 may be integrated on a control IC (integrated circuit) 10 as a control circuit. The switching circuit 101 comprises at least two switches, the switching circuit 101 receives an input voltage Vin, the resonant circuit 102 is coupled to the switching circuit 101, the transformer 103 comprises a primary winding and a secondary winding, wherein the primary winding is coupled to the resonant circuit 102. The rectifier circuit 104 is coupled to the secondary winding, and the rectifier circuit 104 provides an output voltage Vo at its output terminal to a load. A capacitor Co is coupled between the output terminal of the rectifier circuit 104 and a secondary ground GND. The resonant circuit 102 has a resonant frequency fo. In one example, the resonant converter further comprises a feedback circuit 105 and a feedback circuit 110. The feedback circuit 105 provides a feedback signal Vfb representative of the output voltage Vo to the switching control circuit 106. The feedback circuit 105 may comprise a voltage divider, a differential voltage sensing circuit, and any other suitable sensing circuit. The feedback circuit 110 provides a current sense signal Ics representative of a current flowing through the rectifier circuit 104 to the switching control circuit 106. The switching control circuit 106 provides control signals PWMP1 and PWMP2 to the switching circuit 101 to control the at least two switches turning on and off. In one example, the switching control circuit 106 further provides control signals PWMS1 and PWMS2 to the rectifier circuit 104 to control at least two rectifier switches turning on and off. The memory 107 is coupled to the switching control circuit 106 to provide one or more signals for setting. The communication interface 108 is coupled to the memory 107, and the one or more signals for setting can be programmed by the user through the communication interface 108. In one example, the communication interface 108 is coupled to a computing device 109 through a communication bus 111 to receive user inputs.

Figure 2:
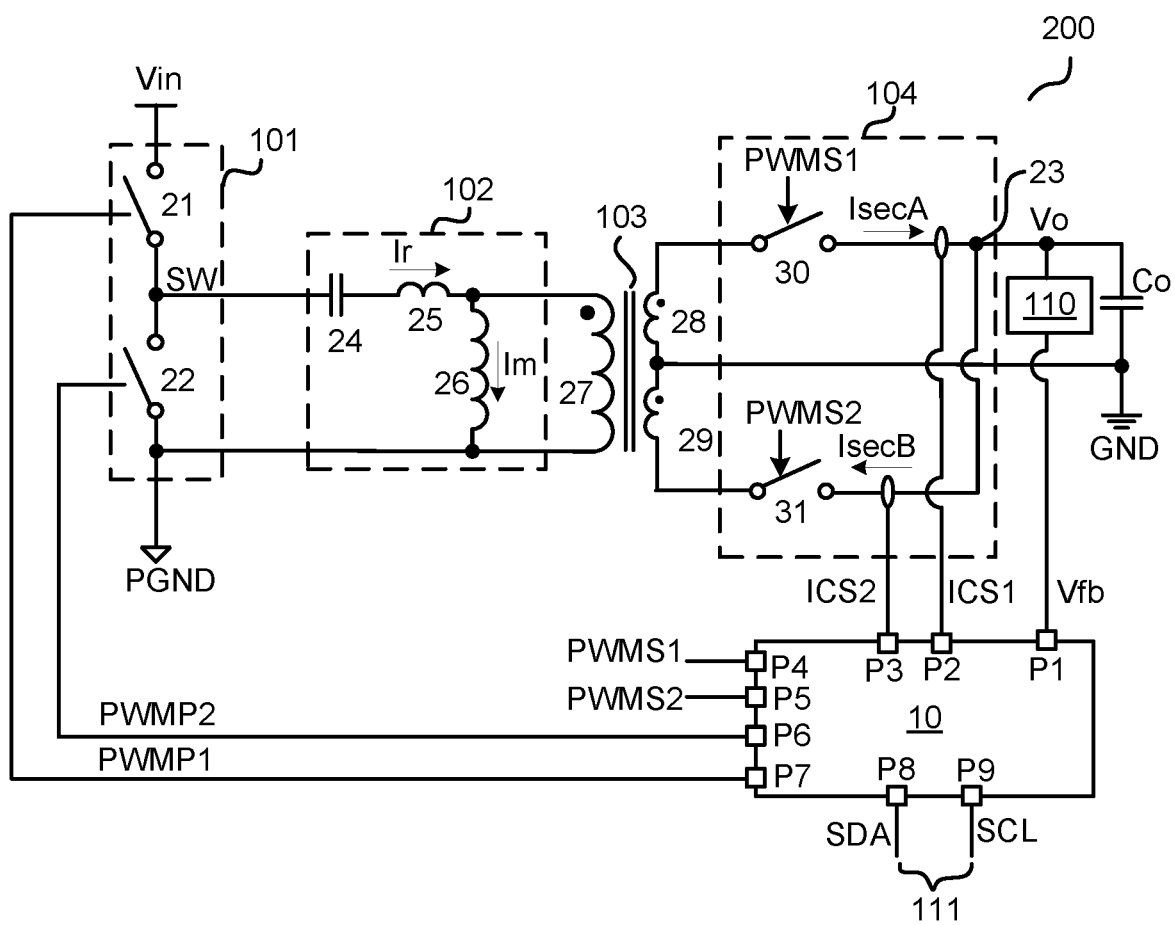
FIG. 2 is a schematic block diagram of a resonant converter 200 in accordance with an embodiment of the present invention.

FIG. 2 is a schematic block diagram of a resonant converter 200 in accordance with an embodiment of the present invention. In the example of FIG. 2, the switching circuit 101 employs a half-bridge topology, comprises a high-side switch 21 coupled between the input voltage Vin and a switch node SW, and a low-side switch 22 coupled between the switch node SW and a primary ground PGND. In FIG. 2, the switching circuit 101 is illustrated with the half-bridge topology as an example, but one with ordinary skill in the art should understand that a full-bridge topology may be employed in another example. The resonant circuit 102 is coupled in series between the switching node SW and a primary winding 27 of the transformer 103. The resonant circuit 102 comprises a resonant capacitor 24 and a resonant inductor 25. In one example, the resonant inductor 25 is a leakage inductance of the primary winding 27. In another example, the resonant inductor 25 is an independent inductor. In real applications, the transformer 103 further comprises a magnetic inductance 26, which is coupled in parallel with the primary winding 27. The magnetic inductance 26, the resonant inductor 25, and the resonant capacitor 24 together form a LLC resonant net. As shown in FIG. 2, a resonant current Ir flows through the resonant inductor 25, a magnetic current Im flows through the magnetic inductance 26. In the example shown in FIG. 2, the resonant frequency fo of the resonant circuit 102 is expressed by the following equation (1), and a resonant period To of the resonant circuit 102 is expressed by the following equation (2), wherein Lr represents the inductance of the resonant inductor 25, and Cr represents the capacitance of the resonant capacitor 24.

$$fo = \frac{1}{2\pi\sqrt{Lr \cdot Cr}} \quad (1)$$

$$To = 2\pi\sqrt{Lr \cdot Cr} \quad (2)$$

The rectifier circuit 104 rectifies a voltage across a secondary winding 28 of the transformer 103 and a voltage across a secondary winding 29 of the transformer 103, and provides the output voltage Vo at an output terminal 23. In the example shown in FIG. 2, the rectifier circuit 104 comprises a rectifier switch 30 and a rectifier switch 31. The rectifier switch 30 is coupled between the secondary winding 28 and the output terminal 23, and the rectifier switch 31 is coupled between the secondary winding 29 and the output terminal 23. A common node of the secondary winding 28 and the secondary winding 29 is coupled to the secondary ground GND. A current IsecA flows through the rectifier switch 30 and a current IsecB flows through the rectifier switch 31. In one example, the rectifier switches 30 and 31 can also be replaced by diodes. One with ordinary skill in the art can understand that the specific circuit structure of the rectifier circuit 104 is not limited to the example shown in FIG. 2.

The control IC 10 comprises pins P1-P9. Pin P1 receives the feedback signal Vfb. Pin P2 receives a current sense signal ICS1 representative of the current IsecA. Pin P3 receive a current sense signal ICS2 representative of the current IsecB. Pin P4 provides the control signal PWMS1 to control the rectifier switch 30. Pin P5 provides the control signal PWMS2 to control the rectifier switch 31. Pin P6 provides the control signal PWMP2 to control the low-side switch 22. Pin P7 provides the control signal PWMP1 to control the high-side switch 21. In one example as shown in FIG. 2, the communication bus 111 comprises a serial data bus SDA and a serial clock bus SCL. Pin P8 receives or sends data signals through the serial data bus SDA, and Pin P9 receives a clock signal through the serial clock bus SCL.

Figure 3:
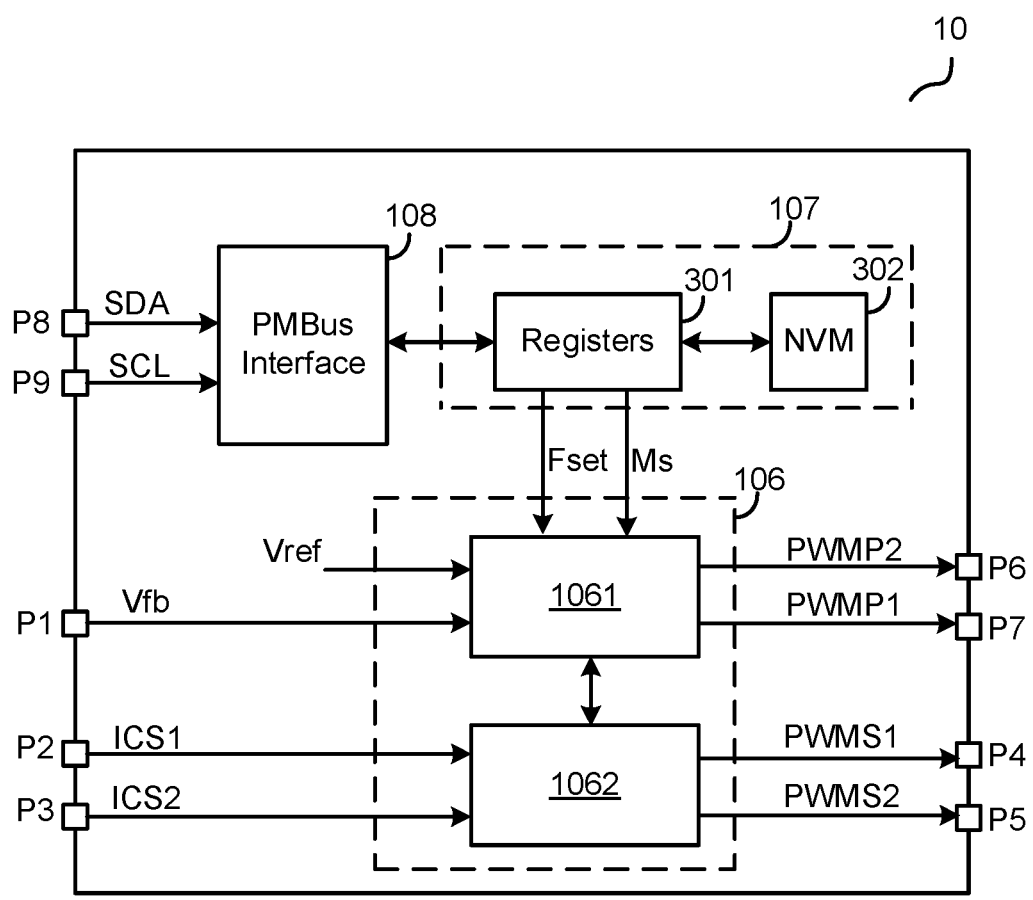
FIG. 3 is a schematic diagram of a control IC 10 used in a resonant converter in accordance with an embodiment of the present invention.

FIG. 3 is a schematic diagram of a control IC 10 used in a resonant converter in accordance with an embodiment of the present invention. In the example of FIG. 3, the communication interface 108 comprises a PMBus (power management bus) interface, which is configured to receive the clock signal through the serial clock bus SCL, and send and receive the data signals through the serial data bus SDA. One with ordinary skill in the art should understand that the communication interface 108 is not limited to the PMBus interface, but can also comprise a SMbus (system management Bus) interface or an I2C (inter-integrated circuit bus) interface. The memory 107 comprises resisters 301 and a NVM (non-volatile memory) 302. The NVM 302 may comprise an EEPROM (electrically erasable programmable read-only memory), a FLASH, an EPROM (erasable programmable read-only memory), a PROM (programmable read-only memory), an EAROM (electrically rewritten read-only memory) and so on. In the example shown in FIG. 3, the registers 301 are coupled to the communication interface 108 and the NVM 302. In one example, the communication interface 108 writes the received data signals into the registers 301 and stores them in the NVM 302. In one example, the resisters 301 provide a frequency setting signal Fset and a mode setting signal Ms according to the data signals stored in the NVM 302 or the data signals received from the communication interface 108. The frequency setting signal Fset is used to set the switching frequency fs of the switching circuit 101, and the mode setting signal Ms is used to set the resonant converter 200 to operate in an open loop mode or a voltage close loop mode.

In one example, the switching control circuit 106 comprises a primary switching control circuit 1061 and a secondary switching control circuit 1062. The primary switching control circuit 1061 is coupled to the registers 301 to receive the frequency setting signal Fset and the mode setting signal Ms. In one example, when the mode setting signal Ms is at a first status, e.g., logic high, the resonant converter 200 is configured as operating in the open loop mode, the primary switching control circuit 1061 is configured to set the frequency f1 of the control signal PWMP1 and the frequency f2 of the control signal PWMP2 according to the frequency setting signal Fset, e.g., making the frequency f1 equal to the frequency f2, that is f1=f2=fs. The high-side switch 21 and the low-side switch 22 are controlled to be on and off complementary by the control signals PWMP1 and PWMP2, and have a same on-time period in each switching period, i.e., an on-time period of the high-side switch is less than half of the resonant period To. In one example, when the mode setting signal is at a second status, e.g., logic low, the resonant converter 200 is configured as operating in the voltage close loop mode, the primary switching control circuit 1061 is configured to provide the control signals PWMP1 and PWMP2 based on the feedback signal Vfb and a reference signal Vref. For example, according to a comparison result of the reference signal Vref and the feedback signal Vfb, the on-time period of the high-side switch 21 is adjusted by the control signal PWMP1, and the on-time period of the low-side switch 22 is adjusted by the control signal PWMP2. In one example, a dead time is set between the control signals PWMP1 and PWMP2 to avoid shoot-through between the high-side switch 21 and the low-side switch 22. The secondary switching control circuit 1062 is configured to provide the control signal PWMS1 to control the rectifier switch 30, and provide the control signal PWMS2 to control the rectifier switch 31. In one example, the secondary switching control circuit 1062 is configured to turn on the rectifier switch 30 according to turning on of the high-side switch 21, and to turn off the rectifier switch 30 according to turning off of the high-side switch 21 or the current sense signal ICS1. In one example, the secondary switching control circuit 1062 is configured to turn on the rectifier switch 31 according to turning on of the low-side switch 22, and to turn off the rectifier switch 31 according to turning off of the low-side switch 22 or the current sense signal ICS2.

Figure 4:
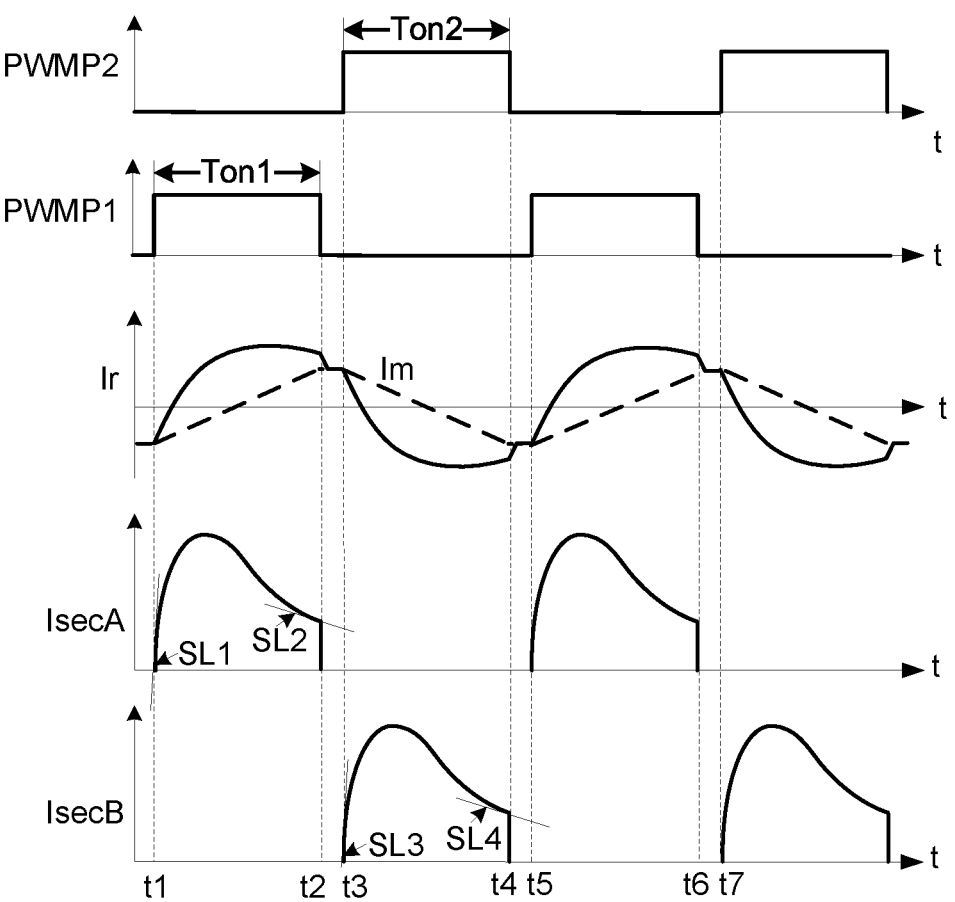
FIG. 4 shows waveforms of the resonant converter 200 in accordance with an embodiment of the present invention.

FIG. 4 shows waveforms of the resonant converter 200 in accordance with an embodiment of the present invention. In one example, a current flows through the rectifier circuit has a first slewing rate when one of the high-side switch 21 and the low-side switch 22 is turned off, and a second slewing rate when one of the high-side switch 21 and the low side switch 22 is turned on, the first slewing rate is less than the second slewing rate. In the example shown in FIG. 4, the resonant converter 200 is set to operate in the open loop mode, the primary switching control circuit 1061 is configured to provide the control signals PWMP1 and PWMP2 according to the frequency setting signal Fset. As shown in FIG. 4, a time period from time t1 to time t5 shows one switching period, a time period from time t2 to time t3 and a time period from time t4 to time t5 show the dead time. At time t1, the control signal PWMP1 becomes high to turn on the high-side switch 21, then the magnetic current Im increases linearly, the resonant current Ir increases to larger than zero, and the current IsecA changes non-sinusoidal. At time t2, the control signal PWMP1 becomes low to turn off the high-side switch 21, the resonant current Ir is larger than the magnetic current Im, the current IsecA is larger than zero. A decreasing slewing rate SL2 of the current IsecA when the high-side switch 21 is turned off at time t2 is far less than an increasing slewing rate SL1 of the current IsecA when the high-side switch 21 is turned on at time t1. At time t3, the control signal PWMP2 becomes high to turn on the low-side switch 22, then the magnetic current Im decreases linearly, the resonant current Ir decreases to less than zero and the current IsecB changes non-sinusoidal. At time t4, the control signal PWMP2 becomes low to turn off the low-side switch 22, the resonant current Ir is less than the magnetic current Im, the current IsecB is larger than zero. A decreasing slewing rate SL4 of the current IsecB when the low-side switch 22 is turned off at time t4 is far less than an increasing slewing rate SL3 of the current IsecB when the low-side switch 21 is turned on at time t3. In one example, an on-time period Ton1 of the high-side switch 21 equals an on-time period Ton2 of the low-side switch 22, and the on-time period Ton1 is less than half of the resonant period To.

Figure 5:
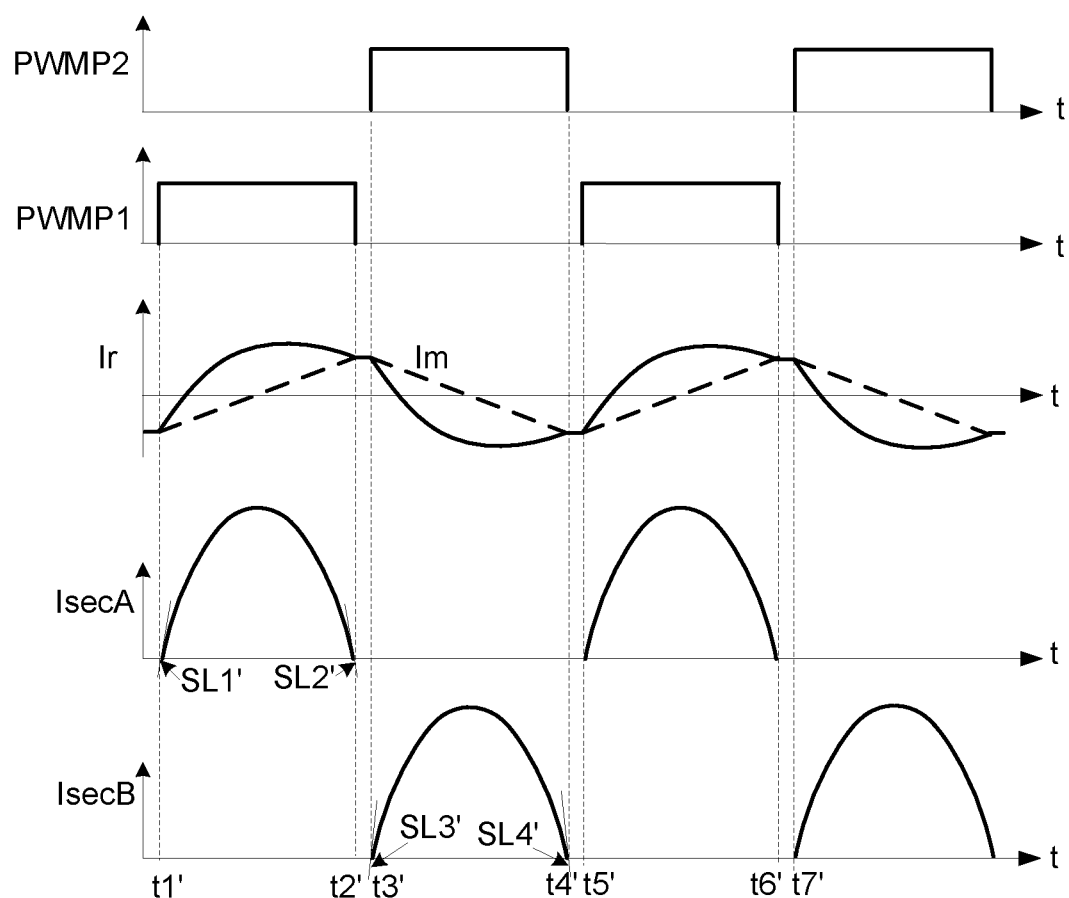
FIG. 5 shows waveforms of a traditional resonant converter working with zero current off.

FIG. 5 shows waveforms of a traditional resonant converter working with zero current off. The switching frequency fs of the traditional resonant converter is equal to the resonant frequency fo, so the current IsecA and the current IsecB are sine waves. As shown in FIG. 5, at time t1', the control signal PWMP1 becomes high to turn on the high-side switch 21, then the magnetic current Im increases linearly, the resonant current Ir increases to larger than zero, the current IsecA changes sinusoidal. At time t2', the control signal PWMP1 becomes low to turn off the high-side switch 21, the resonant current Ir is equal to the magnetic current Im, and the current IsecA is zero. A decreasing slewing rate SL2' of the current IsecA when the high-side switch 21 is turned off at time t2' is equal to an increasing slewing rate SL1' of the current IsecA when the high-side switch 21 is turned on at time t1'. At time t3', the control signal PWMP2 becomes high to turn on the low-side switch 22, then the magnetic current Im decreases linearly, the resonant current Ir decreases to less than zero and the current IsecB changes sinusoidal. At time t4', the control signal PWMP2 becomes low to turn off the low-side switch 22, the resonant current Ir is equal to the magnetic current Im, and the current IsecB is zero. A decreasing slewing rate SL4' of the current IsecB when the low-side switch 22 is turned off at time t4' is equal to an increasing slewing rate SL3' of the current IsecB when the low-side switch 21 is turned on at time t3'. The traditional resonant converter can realize zero current switching (ZCS), but it is sensitive to circuit parameters change. When the circuit parameters change slightly due to the factors such as environment, temperature, device aging, etc. . . . , it cannot realize ZCS, and power consumption increases rapidly.

In one example of the present invention, on-time periods of the at least two switches in the switching circuit 101 are respectively set less than half of the resonant period To, and the inductance value of the resonant inductor Lr and the capacitance value of the resonant capacitor Cr are appropriate selected, so that the resonant converter of the present invention is different from that of the traditional ZCS resonant converter. Embodiments of the present invention have lower peak current, lower effective current, and higher overall efficiency. Moreover, the resonant converter of the embodiments of the present invention is insensitive to the parameters change, and the design is easier. Even when the parameters change due to various factors, the power consumption will not increase rapidly and the efficiency will not be greatly affected.

Figure 6A:
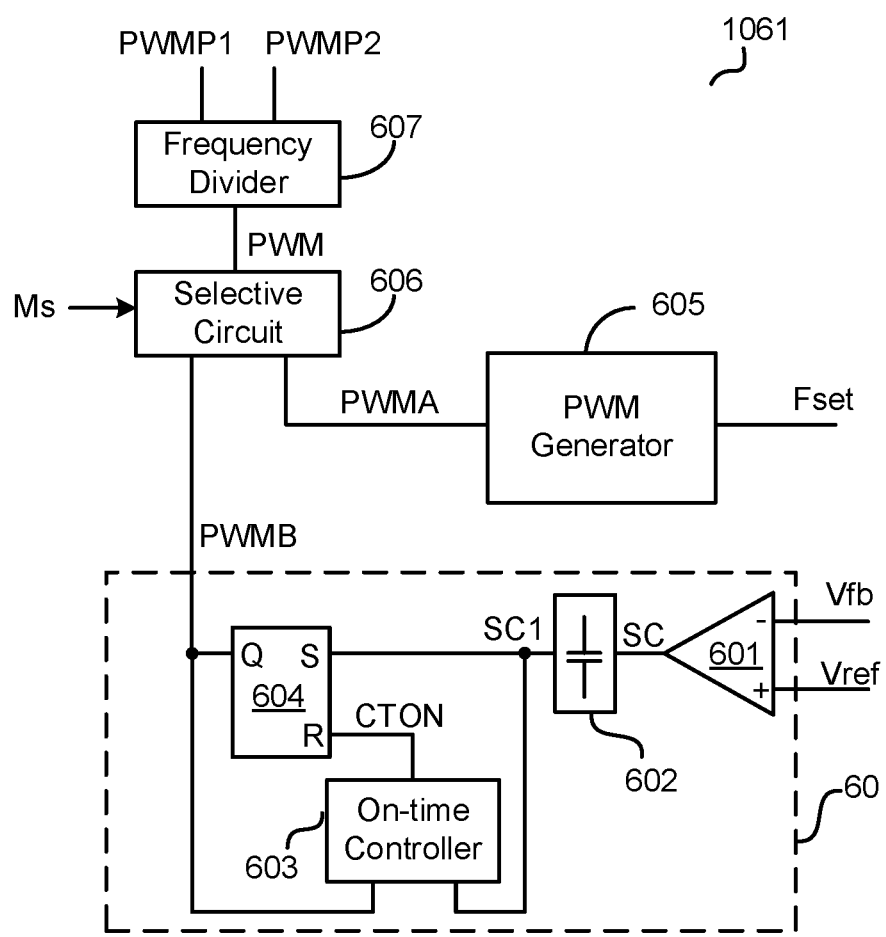
FIG. 6A is a schematic diagram of a primary switching control circuit 1061 in accordance with an embodiment of the present invention.

FIG. 6A is a schematic diagram of a primary switching control circuit 1061 in accordance with an embodiment of the present invention. In the example of FIG. 6A, the primary switching control circuit 1061 comprises a close loop control circuit 60, a PWM generator 605, a selective circuit 606, and a frequency divider 607.

The close loop control circuit 60 further comprises a comparator 601, an isolated transmission circuit 602, an on-time controller 603, and a logic circuit 604. The comparator 601 has an inverting terminal, a non-inverting terminal and an output terminal. The inverting terminal is configured to receive the feedback signal Vfb, the non-inverting terminal is configured to receive the reference signal Vref, and the output terminal is configured to provide a comparison signal SC based on a comparison result between the feedback signal Vfb and the reference signal Vref. The isolated transmission circuit 602 is configured to receive the comparison signal SC, and provides an isolated signal SC1 based on the comparison signal SC to the on-time controller 603 and the logic circuit 604. The comparison signal SC takes the secondary ground GND as its reference ground, and the isolated signal SC1 takes the primary ground PGND as its reference ground. In one example, the isolated transmission circuit 602 comprises a capacitor. The logic circuit 604 is configured to provide a pulse width modulation signal PWMB to control the high-side switch 21 and the low-side switch 22 in the voltage close loop mode according to the comparison signal SC and an on-time signal CTON. The pulse width modulation signal PWMB has a rising edge and a falling edge. In one example, the logic circuit 604 comprises a RS flip-flop. The on-time controller 603 is configured to provide the on-time signal CTON based on the comparison signal SC and the pulse width modulation signal PWMB. When a rising edge of the comparison signal SC is later than the falling edge of the pulse width modulation signal PWMB, the on-time signal CTON decreases (e.g., to reduce a time period during which the pulse width modulation signal PWMB maintains high). And when a rising edge of the comparison signal SC is earlier than the falling edge of the pulse width modulation signal PWMB, the on-time signal CTON increases (e.g., to extend the time period during which the pulse width modulation signal PWMB maintains high).

The PWM generator 605 is configured to provide a pulse width modulation signal PWMA according to the frequency setting signal Fset to control the high-side switch 21 and the low-side switch 22 in the open loop mode. In one example, the pulse width modulation signal PWMA has a duty cycle of 50%. Moreover, the pulse width modulation signal PWMA has a frequency determined by the frequency setting signal Fset. The selective circuit 606 selects one of the pulse width modulation signals PWMA and PWMB as the pulse width modulation signal PWM in response to the mode setting signal Ms. When the mode setting signal Ms indicates that the resonant converter 200 should work in the open loop mode, the selective circuit 606 is configured to select the pulse width modulation signal PWMA as the pulse width modulation signal PWM. When the mode setting signal Ms indicates that the resonant converter 200 should work in the voltage close loop mode, the selective circuit 606 is configured to select the pulse width modulation signal PWMB as the pulse width modulation signal PWM. The frequency divider 607 is configured to provide the control signals PWMP1 and PWMP2 based on the pulse width modulation signal PWM via frequency dividing.

Figure 6B:
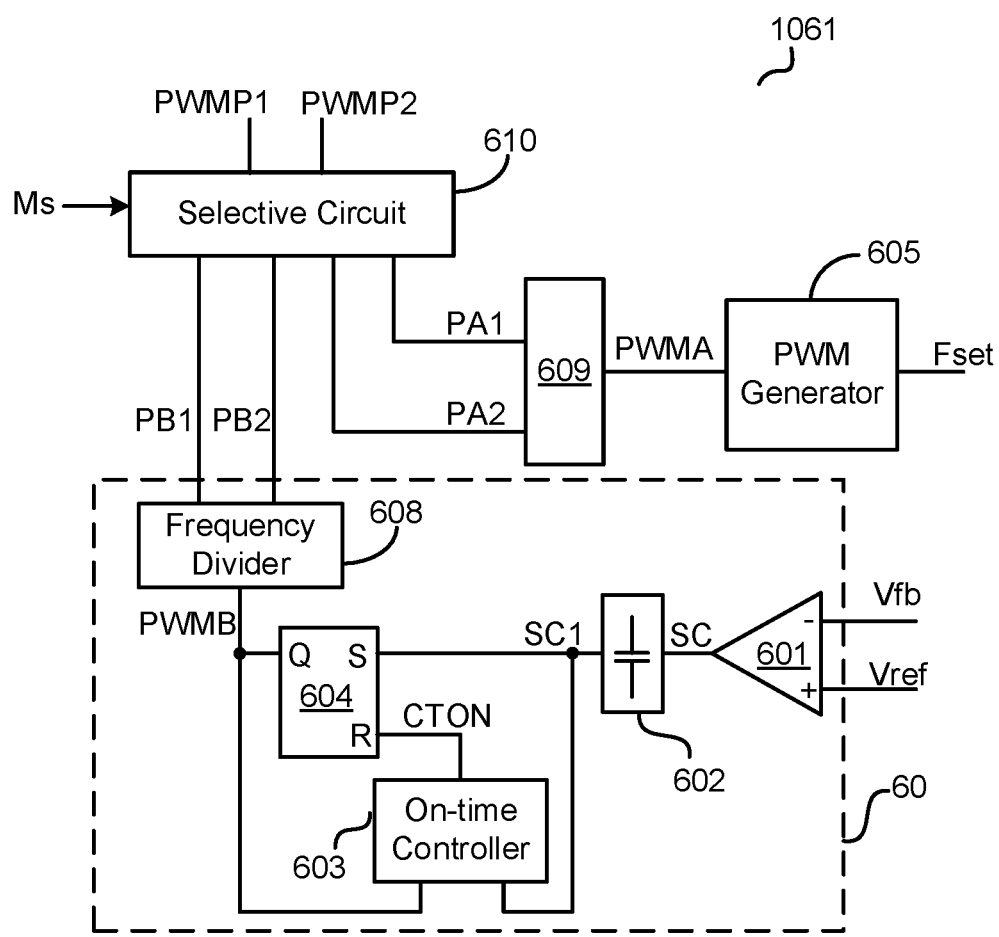
FIG. 6B is a schematic diagram of the primary switching control circuit 1061 in accordance with another embodiment of the present invention.

FIG. 6B is a schematic diagram of the primary switching control circuit 1061 in accordance with another embodiment of the present invention. As shown in FIG. 6B, the close loop control circuit 60 further comprises a frequency divider 608. The frequency divider 608 is configured to provide control signals PB1 and PB2 based on the pulse width modulation signal PWMB via frequency dividing, to control the high-side switch 21 and the low-side switch 22 respectively in the voltage close loop mode. As shown in FIG. 6, the primary switching control circuit 1061 further comprises a frequency divider 609. The frequency divider 609 is configured to provide control signals PA1 and PA2 based on the pulse width modulation signal PWMA via frequency dividing. In the example shown in FIG. 6B, the primary switching control circuit 1061 further comprises a selective circuit 610. In response to the mode setting signal Ms, the selective circuit 610 is configured to select one of the control signals PA1 and PB1 as the control signal PWMP1, and select one of the control signals PA1 and PB2 as the control signal PWMP2. When the mode setting signal Ms indicates that the resonant converter 200 should work in the open loop mode, the selective circuit 610 is configured to select the control signal PA1 as the control signal PWMP1 and select the control signal PA2 as the control signal PWMP2. When the mode setting signal Ms indicates that the resonant converter 200 should work in the voltage close loop mode, the selective circuit 610 is configured to select the control signal PB1 as the control signal PWMP1 and select the control signal PB2 as the control signal PWMP2.

Figure 7:
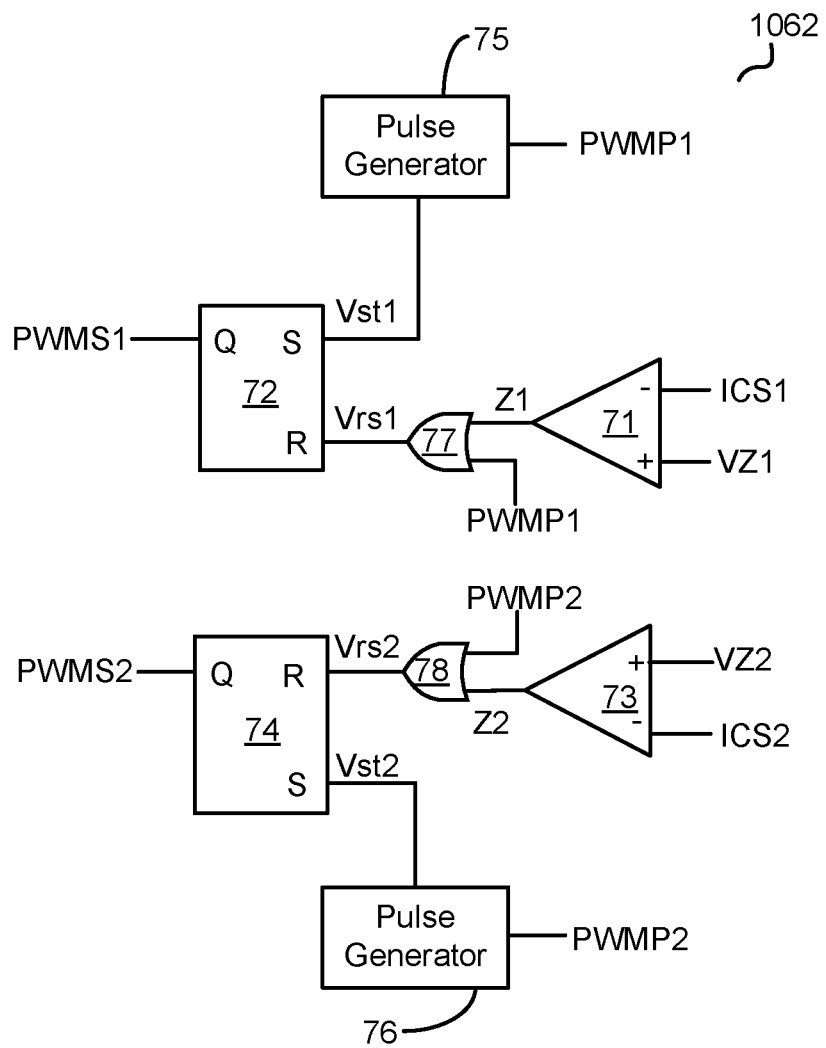
FIG. 7 is a schematic diagram of a secondary switching control circuit 1062 in accordance with an embodiment of the present invention.

FIG. 7 is a schematic diagram of a secondary switching control circuit 1062 in accordance with an embodiment of the present invention. As shown in FIG. 7, the secondary switching control circuit 1062 comprises a comparator 71, a logic circuit 72, a comparator 73, a logic circuit 74, a pulse generator 75, a pulse generator 76, a logic circuit 77, and a logic circuit 78. The pulse generator 75 is configured to provide a set signal Vst1 in response to the control signal PWMP1. In one example, the logic circuit 72 is set by the set signal Vst1 at the rising edge of the control signal PWMP1, to turn on the rectifier switch 30 by the control signal PWMS1. The comparator 71 provides a zero signal Z1 via comparing the current sense signal ICS1 and a zero reference VZ1. The logic circuit 77 provides a reset signal Vrs1 to reset the logic circuit 72 responsive to the zero signal Z1 and the control signal PWMP1. In one example, the logic circuit 77 comprises an OR gate. In one example, the logic circuit 72 is reset at the falling edge of the control signal PWMP1 or when the current sense signal ICS1 is less than the zero reference VZ1, to turn off the rectifier switch 30 via the control signal PWMS1. In one example, the logic circuit 72 comprises a RS flip-flop. The pulse generator 76 is configured to provide a set signal Vst2 in response to the control signal PWMP2. In one example, the logic circuit 74 is set by the set signal Vst2 at the rising edge of the control signal PWMP2, to turn on the rectifier switch 31 by the control signal PWMS2. The comparator 73 provides a zero signal Z2 via comparing the current sense signal ICS2 and a zero reference VZ2. The logic circuit 78 provides a reset signal Vrs2 to reset the logic circuit 74 responsive to the zero signal Z2 and the control signal PWMP2. In one example, the logic circuit 78 comprises an OR gate. In one example, the logic circuit 74 is reset at the falling edge of the control signal PWMP2 or when the current sense signal ICS2 is less than the zero reference VZ2, to turn off the rectifier switch 31 via the control signal PWMS2. In one example, the logic circuit 74 comprises a RS flip-flop. In one example, the zero reference VZ1 is equal to the zero reference VZ2.

Figure 8:
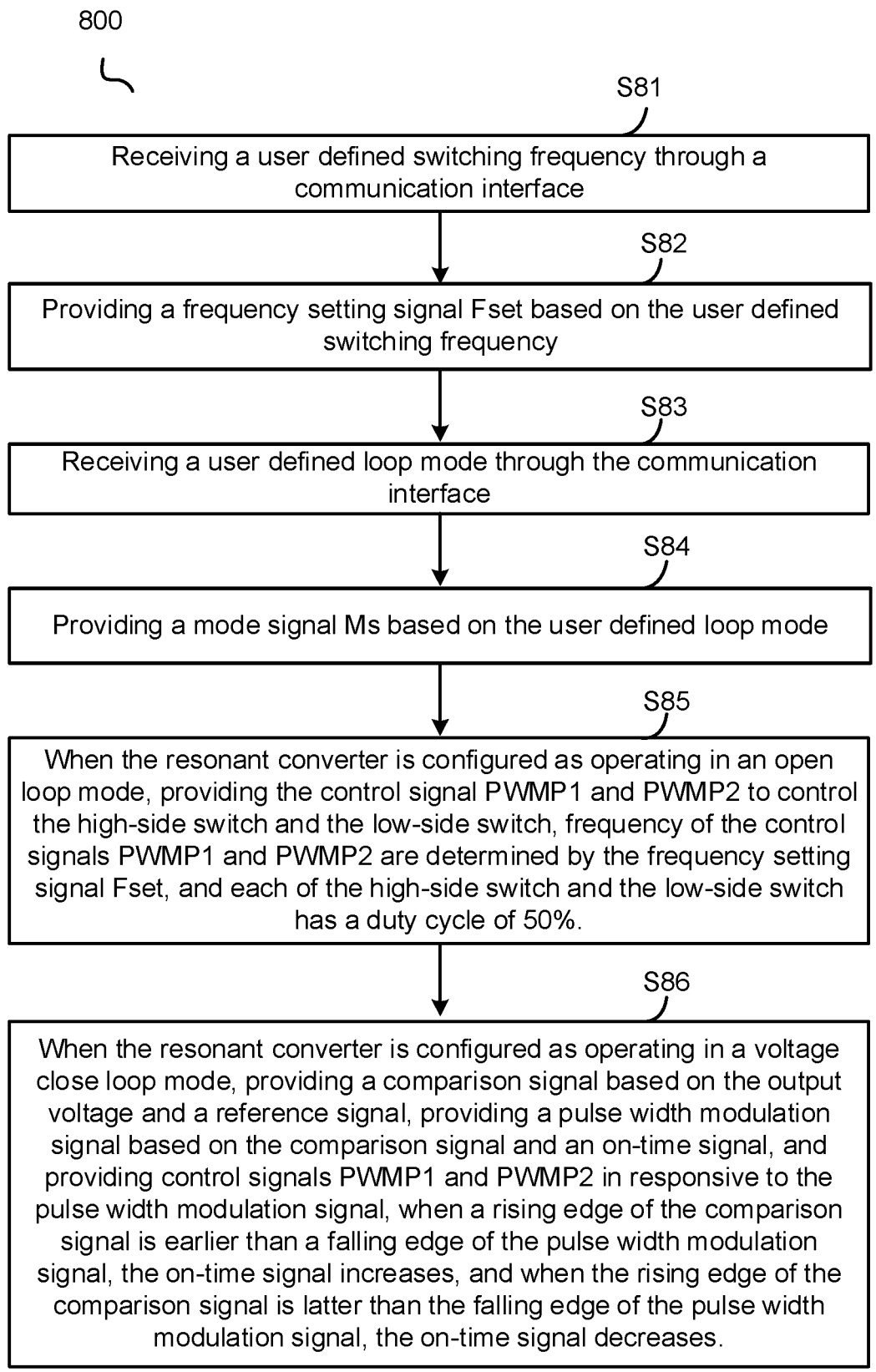
FIG. 8 is a flowchart of a control method for a resonant converter in accordance with an embodiment of the present invention.

FIG. 8 is a flowchart of a control method for a resonant converter in accordance with an embodiment of the present invention, comprises steps S81-S86. The resonant converter receives the input voltage Vin and provides the output voltage Vo. The resonant converter comprises a switching circuit and a resonant circuit, wherein the switching circuit comprises a high-side switch coupled between the input voltage and a switching node, and a low-side switch coupled between the switching node and a primary reference ground. The resonant circuit comprises a resonant capacitor Cr coupled to the switching node and a resonant indictor Ls.

The step S81 comprises receiving a user defined switching frequency through a communication interface.

The step S82 comprises providing a frequency setting signal Fset based on the user defined switching frequency.

The step S83 comprises receiving a user defined loop mode through the communication interface. The user defined loop mode may comprise an open loop mode and a voltage close loop mode.

The step S84 comprises providing a mode signal Ms based on the user defined loop mode.

The step S85 comprises when the resonant converter is configured as operating in the open loop mode, providing control signals PWMP1 and PWMP2 with frequency fs to respectively control the high-side switch and the low-side switch. The frequency fs of the control signals PWMP1 and PWMP2 is determined by the frequency setting signal Fset, and each of the high-side switch and the low-side switch has a duty cycle of 50%. In one example, both of an on-time period of the high-side switch and an on-time period of the low-side switch are less than half of a resonant period of the resonant circuit.

The step S86 comprises when the resonant converter is configured as operating in a voltage close loop mode, providing a comparison signal based on the output voltage Vo and a reference signal, providing a pulse width modulation signal based on the comparison signal and an on-time signal, and providing control signals PWMP1 and PWMP2 in response to the pulse width modulation signal. When a rising edge of the comparison signal is earlier than a falling edge of the pulse width modulation signal, the on-time signal increases, and when the rising edge of the comparison signal is latter than the falling edge of the pulse width modulation signal, the on-time signal decreases.

Note that in the flowchart described above, the functions indicated in the boxes can also occur in a different order than those shown in the figure. Fox example, two boxes presented one after another can actually be executed essentially at the same time, or sometimes in reverse order, depending on the specific functionality involved.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit for a resonant converter, the resonant converter having a switching circuit, a resonant circuit, a transformer and a rectifier circuit, wherein the switching circuit comprises a high-side switch and a low-side switch, the transformer comprises a primary winding coupled to the resonant circuit, and a secondary winding coupled to the rectifier circuit to provide an output voltage, the control circuit comprising:
   a communication interface;
   a memory, coupled to the communication interface, the memory is configured to provide a frequency setting signal, the frequency setting signal is capable of being programmed through the communication interface; and
   a primary switching control circuit, coupled to the memory to receive the frequency setting signal, and configured to provide a first control signal and a second control signal to control the high-side switch and the low-side switch respectively, when the resonant converter is set to operate in an open loop mode, a frequency of the first control signal and the second control signal is determined by the frequency setting signal, an on-time period of the high-side switch is equal to an on-time period of the low-side switch, and the on-time period of the high-side switch is less than half of a resonant period of the resonant circuit.

2. The control circuit of claim 1, wherein a current flows through the rectifier circuit has a first slewing rate when one of the high-side switch and the low-side switch is turned off, and the current flows through the rectifier circuit has a second slewing rate when one of the high-side switch and the low side switch is turned on, the first slewing rate is less than the second slewing rate.

3. The control circuit of claim 1, wherein the primary switching control circuit further comprises:
a comparator, configured to receive a feedback signal representative of the output voltage and a reference signal, and configured to provide a comparison signal via comparing the feedback signal with the reference signal;
an on-time controller, configured to provide an on-time signal based on the comparison signal and a first pulse width modulation signal, the on-time signal is adjusted based on a rising edge of the comparison signal and a falling edge of the first pulse width modulation signal; and
a logic circuit, configured to provide the first pulse width modulation signal to control the high-side switch and the low side switch in a voltage close loop mode based on the comparison signal and the on-time signal.

4. The control circuit of claim 1, wherein:
the memory is further configured to provide a mode setting signal, the mode setting signal is capable of being programmed through the communication interface; and wherein
the primary switching control circuit is further configured to set the resonant converter to operate in either the open loop mode or in a voltage close loop mode.

5. The control circuit of claim 1, wherein when the resonant converter is set to operate in a voltage close loop mode, the primary switching control circuit is configured to provide the first control signal and the second control signal based on the output voltage, the on-time period of the high-side switch and the on-time period of the low-side switch are adjusted based on the output voltage and a reference signal.

6. The control circuit of claim 1, further comprising:
a secondary switching control circuit, configured to provide a third control signal and a fourth control signal to control the rectifier circuit; wherein
the third control signal is configured to turn on a first rectifier switch in the rectifier circuit at a rising edge of the first control signal, and turn off the first rectifier switch at a falling edge of the first control signal or when a current flowing through the first rectifier switch is less than zero; and wherein
the fourth control signal is configured to turn on a second rectifier switch in the rectifier circuit at a rising edge of the second control signal, and turn off the second rectifier switch at a falling edge of the second control signal or when a current flowing through the second rectifier switch is less than zero.

7. The control circuit of claim 6, wherein the secondary switching control circuit further comprises:
a first comparator, configured to provide a first zero signal via comparing a first current sense signal representative of the current flowing through the first rectifier switch with a zero reference;
a first logic circuit, configured to provide the third control signal based on the first control signal and the first zero signal;
a second comparator, configured to provide a second zero signal via comparing a second current sense signal representative of the current flowing through the second rectifier switch with the zero reference; and a second logic circuit, configured to provide the fourth control signal based on the second control signal and the second zero signal.

8. A control method for controlling a resonant converter, the resonant converter having a switching circuit, a resonant circuit, a transformer and a rectifier circuit, wherein the switching circuit comprises a high-side switch and a low-side switch, the transformer comprises a primary winding coupled to the resonant circuit, and a secondary winding coupled to the rectifier circuit to provide an output voltage, the control method comprising:
providing a frequency setting signal, the frequency setting signal is capable of being programmed through a communication interface;
providing a first control signal to control the high-side switch and a second control signal to control the low-side switch; and
operating the resonant converter in an open loop mode, wherein a frequency of the high-side switch and the low-side switch is determined by the frequency setting signal, an on-time period of the high-side switch is equal to an on-time period of the low-side switch, and the on-time period of the high-side switch is less than half of a resonant period of the resonant circuit.

9. The control method of claim 8, wherein when the resonant converter is set to operate in a voltage close loop mode, the on-time period of the high-side switch and the on-time period of the low-side switch are adjusted based on the output voltage and a reference signal.

10. The control method of claim 8, further comprising:
providing a mode setting signal, the mode setting signal is capable of being programmed through a communication interface; and
setting the resonant converter to operate in either the open loop mode or a voltage close loop mode in responsive to the mode setting signal.

11. The control method of claim 8, wherein a current flows through the rectifier circuit has a first slewing rate when one of the high-side switch and the low-side switch is turned off, and the current flows through the rectifier circuit has a second slewing rate when one of the high-side switch and the low-side switch is turned on, the first slewing rate is less than the second slewing rate.

12. The control method of claim 8, further comprising:
providing a comparison signal based on the output voltage and a reference signal;
providing a pulse width modulation signal based on the comparison signal and an on-time signal, the on-time signal is adjusted based on a rising edge of the comparison signal and a falling edge of the pulse width modulation signal; and
providing the first control signal and the second control signal based on the pulse width modulation when the resonant converter is set to operate in a voltage close loop mode.

13. The control method of claim 12, wherein:
when the rising edge of the comparison signal is earlier than the falling edge of the pulse width modulation signal, the on-time signal changes to increase a time period during which the first pulse width modulation signal maintaining high; and wherein
when the rising edge of the comparison signal is later than the falling edge of the first pulse width modulation signal, the on-time signal changes to reduce the time period during which the first pulse width modulation signal maintaining high.

14. The control method of claim 8, further comprising providing a third control signal to control a rectifier switch in the rectifier circuit, the third control signal is configured to turn on the rectifier switch at a rising edge of the first control signal, and turn off the rectifier switch at a falling edge of the first control signal or when a current flowing through the rectifier switch is less than zero.

15. A resonant converter, comprising:
- a switching circuit, comprising a high-side switch and a low-side switch;
- a resonant circuit, coupled to the switching circuit, the resonant circuit comprises a resonant inductor and a resonant capacitor;
- a transformer, comprising a primary winding and a secondary winding, wherein the primary winding is coupled to the resonant circuit;
- a rectifier circuit, coupled to the secondary winding, and configured to provide an output voltage; and
- a control circuit, configured to provide a first control signal to control the high-side switch and a second control signal to control the low-side switch, the control circuit is configured to set the resonant converter to operate in either an open loop mode or a voltage close loop mode; wherein
- when the resonant converter is set to operate in the open loop mode, a frequency of the high-side switch and the low side switch is determined by a frequency setting signal, an on-time period of the high-side switch is equal to an on-time period of the low-side switch, and the on-time period of the high-side switch is less than half of a resonant period of the resonant circuit.

16. The resonant converter of claim 15, wherein a current flows through the rectifier circuit has a first slewing rate when one of the high-side switch and the low-side switch is turned off, and the current flows through the rectifier circuit has a second slewing rate when one of the high-side switch and the low-side switch is turned on, the first slewing rate is less than the second slewing rate.

17. The resonant converter of claim 15, wherein when one of the high-side switch and the low-side switch is turned off, a current flows through the rectifier circuit is larger than zero.

18. The resonant converter of claim 15, further comprising:
- a memory, configured to provide the frequency setting signal, the frequency setting signal is capable of being programmed through a communication interface.

19. The resonant converter of claim 15, further comprising:
- a memory, configured to provide a mode setting signal, the mode setting signal is capable of being programmed through a communication interface; wherein
- the control circuit is further configured to set the resonant converter to operate in either the open loop mode or the voltage close loop mode based on the mode setting signal.

20. The resonant converter of claim 15, wherein when the resonant converter is set to operate in the voltage close loop mode, the on-time period of the high-side switch and the on-time period of the low-side switch are adjusted based on the output voltage and a reference signal.

* * * * *